United States Patent [19]
Schlie et al.

[11] Patent Number: 5,301,203
[45] Date of Patent: Apr. 5, 1994

[54] SCALABLE AND STABLE, CW PHOTOLYTIC ATOMIC IODINE LASER

[75] Inventors: LaVerne A. Schlie; Robert D. Rathge, both of Albuquerque, N. Mex.

[73] Assignee: The United States of America as represented by the Secretary of the Air Force, Washington, D.C.

[21] Appl. No.: 949,617

[22] Filed: Sep. 23, 1992

[51] Int. Cl.$^5$ ............................ H01S 3/22; H01S 3/14
[52] U.S. Cl. ........................................ 372/55; 372/59; 372/58; 372/60; 372/70; 372/39; 372/95; 372/92; 372/109
[58] Field of Search ..................... 372/55, 59, 56, 58, 372/69, 70, 76, 86, 87, 92, 95, 96, 94, 60, 39, 109

[56] References Cited

U.S. PATENT DOCUMENTS

| | | | |
|---|---|---|---|
| 3,842,364 | 10/1974 | Srinivasan | 372/55 X |
| 4,068,196 | 1/1978 | Hohla et al. | 372/55 X |
| 4,210,877 | 7/1980 | Pleasance et al. | 372/55 X |
| 4,318,060 | 3/1982 | Davis | 372/55 X |
| 4,535,457 | 8/1985 | Schlie et al. | 372/58 |
| 4,631,732 | 12/1986 | Christensen | 372/87 |
| 4,641,316 | 2/1987 | Collins et al. | 372/4 |
| 4,955,035 | 9/1990 | Gekat | 372/9 |
| 5,008,593 | 4/1991 | Schlie et al. | 315/39 |
| 5,055,741 | 10/1991 | Schlie | 315/39 |
| 5,117,434 | 5/1992 | Oohashi et al. | 372/56 |
| 5,199,041 | 3/1993 | Schmiedberger et al. | 372/55 X |

FOREIGN PATENT DOCUMENTS 2319989 7/1976 France ............... 372/55 X

OTHER PUBLICATIONS

Churassy et al., "The Chemical oxygen–iodine laser: Comparison of a theoretical model with experimental results," J. Appl. Physics. vol. 62, Jul. 1987, 31-35.

Vagin et al., "Influence of molecular chlorine on the output energy of a pulsed oxygen-iodine chemical laser", Soviet Jornal of Quantum Electronics, vol. 21, No. 7, N.Y., 1991.

*Primary Examiner*—Brian Healy
*Attorney, Agent, or Firm*—Stanton E. Collier; Donald J. Singer

[57] ABSTRACT

The scalable and stable, cw photolytically excited atomic iodine laser operates at 1.315 nm. An initial power level of 55 watts/liter was obtained via the cw photolysis of an alkyl-iodide gas like $C_3F_7I$. The greatly enhanced laser performance was achieved using a microwave excited, electrodeless Hg plasma lamp excited with a d.c., low ripple cw microwave radiation. Both high flow, air cooling and liquid dimethyl polysiloxane cooling of these high pressure Hg lamps provided long lifetime operation with the latter promoting, stable laser operation. Transverse flow of the above gas for the removal of the quenching by-product $I_2$ is incorporated into the laser. To insure good laser amplitude stability, both the high power magnetrons and the lamps are liquid cooled. The scalable, prolonged and stable operation of this laser system is possible via use of a closer cycle, condensative/evaporative fuel system coupled to a high flow, internal blower for heavy gases. Over the excitation length of 25 cm, an average small signal gain coefficient of 2%/cm. is produced by exciting the transversely flowing gas from one side. Higher powers are achieveable by exciting the gas from both sides, increasing the ultraviolet lamp radiation with higher microwave power and/or more efficient UV operating plasma lamps, and/or adjusting the UV lamp emission into the $C_3F_7I$ absorption in the 240-320 nm region.

33 Claims, 13 Drawing Sheets 500 us / DIV

FIG. 14 (a)

$$\eta = \eta_{power\ cond} \cdot \eta_{uW} \cdot \eta_{lamp\ UV} \cdot \eta_{pump} \cdot \eta_{QE} \cdot \eta_{ext}$$

| $(ac \to dc)$ | $(dc \to uW)$ | $(uW \to UV)$ | $(UV \to I^*)$ | $(I^* \to h\nu)$ | $(h\nu_{int} \to h\nu_{lase})$ |
|---|---|---|---|---|---|
| 9% | 6% | 20% | 21% | 98% | 80% |

$$\eta = \eta_{power\ cond} \cdot \eta_{uW} \cdot \eta_{lamp\ UV} \cdot \eta_{pump\ I^*} \cdot \eta_{QE} \cdot \eta_{ext}$$

| 98% | 85% | 50% |
|---|---|---|
| (OPTIMIZE) | (OPTIMIZE) | (BCl) |

~6.8%

SCALABLE AND STABLE, CW PHOTOLYTIC ATOMIC IODINE LASER

STATEMENT OF GOVERNMENT INTEREST

The invention described herein may be manufactured and used by or for the Government for governmental purposes without the payment of any royalty thereon.

BACKGROUND OF THE INVENTION

The present invention relates to lasers, and, in particular, relates to gaseous lasers, and, in greater particularity, relates to cw photolytic lasers.

A prior cw iodine laser operated at 1.315 microns and had an unlimited operating time. This utilized a high pressure, water cooled, d.c. Hg arc lamp for the ultraviolet (UV) photolysis of the alkyl-iodine laser fuel (specifically C3F7I) and either used longitudinal or transverse flow in the gain cell. Both the ground state iodine atoms and the photolytic quenching by-product $I_2$ were removed which is necessary to sustain cw operation. The unlimited operating time was achieved by using a passive closed cycle $C_3F_7I$ gaseous supply system which removed the $I_2$ from the $C_3F_7I$ laser fuel via a condensation/evaporation process and simultaneously created the required flow velocity. Better performance was achieved using transverse flow since a more constant flow velocity occurred across the lasing region. These excellent results, however, occurred at low output powers of a few milliwatts. Such low powers made this cw photolytic iodine laser useful only as a gain probe of iodine media like Chemical Oxygen Iodine Lasers (COIL) or pulsed photolytic iodine devices.

SUMMARY OF THE INVENTION

The present invention is a scalable cw photolytically excited atomic iodine laser operating at 1.315 micron. An initial power of 55 watts/liter was obtained via the cw photolysis of an alkyl-iodide gas like $C_3F_7I$. The greatly enhanced laser performance was achieved using a microwave excited, electrodeless Hg plasma lamp excited with a d.c., low ripple ($\cong 1\%$) cw microwave radiation. Transverse flow for the removal of the quenching by-product $I_2$ is incorporated into the laser. To insure good laser amplitude stability, both the high power magnetrons (operated at 1.5 KW but capable of 3 KW performance) and the lamps (normally Hg) are liquid cooled, respectively, by $H_2O$ and dimethyl siloxane. The use of the high ultraviolet transmissive properties of the dimethyl siloxane lamp coolant removed the requirement for large flow air cooling ($\cong 150$ cfm) of the lamps; thereby, allowing good amplitude stability. Elimination of the air coolant also enabled use of a slow $N_2$ purge; thereby preventing the formation of ozone, $O_3$, a strong absorber of the UV radiation exciting this cw photolytic atomic iodine laser. Over an excitation length of 25 cm, an average small signal gain coefficient of 2%/cm is produced by exciting the transversely flowing $C_3F_7I$ from only one side. Higher power may be achieved by exciting the flow from both sides increasing the ultraviolet lamp radiation with higher microwave power and/or more efficient UV operating plasma lamps, and/or "tailoring" the UV lamp emission into the $C_3F_7I$ absorption in the 240-320 nm region.

This laser employed a microwave (2.45 GHz) excited UV lamps in the transversely flowing photolytic atomic iodine laser thereby increasing the stable laser power by a factor of nearly 1000 to cw powers of 5.5 watts with an excitation length of 25 cm. The enhanced power performance was achieved due the higher available ultraviolet radiation in the 240-320 nm photolytic pumping region of $C_3F_7I$ from microwave excited cw lamps relative to the previously used high pressure mercury, d.c. arc lamps. Another large factor of 2.5-5 occurred because the excitation of the lamps is with d.c., low ripple (<1%) microwave radiation. Finally, for additionally enhanced laser stability, the magnetron is water cooled along with either liquid cooling (dimethyl polysiloxane) or suppressed vibrational air-cooling of the lamps is employed. It is important to emphasize that the d.c., low ripple microwave radiation source gave greater than a 2.5 increase in the extractable laser power from this same 25 cm gain length relative to its performance when only a.c. excited microwave radiation at 2.45 GHz was employed to excite the UV plasma lamps.

Therefore, one object of the present invention is a high power cw iodine laser having excellent stability and optical properties.

Another object of the present invention is a cw iodine laser that is capable of powers of 1 to 10 kilowatts by (1) physically scaling the gain length to 1-2 meters and the cross sectional gain area to $10 \times 10$ cm$^2$ and (2) enhancing the volumetric extractable laser energy from 55 watts/liter to 400 watts per liter by extracting energy from the entire cross-sectional area of the gain medium, exciting the transverse flowing gain region from both sides, and doubling the plasma lamps energy from 3 to 6 kilowatts.

Another object of the present invention is a cw iodine laser that utilizes magnetrons having water cooling and either liquid cooling or very low vibrational induced air cooling of the plasma lamps.

Another object of the present invention is to provide a cw iodine laser having electro-optical switches internal to the stable or unstable resonator system.

Another object of the present invention is to provide a cw iodine laser having an apparatus for coupling high intensity ultraviolet (UV) radiation (240-320 nm) from lamps excited with cw microwave lamps into either transversely or longitudinally flowing photolytic atomic iodine gain medium resulting in high power (5.5 watt over 25 cm or 55 watts/liter).

Another object of the present invention is to provide a cw iodine laser utilizing plasma UV lamps excited with d.c., low ripple (<1%) microwave radiation.

Another object of the present invention is to provide a cw iodine laser having an internal turbo-molecular blower (or gas turbine blower) coupled to a condensative/evaporative $C_3F_7I$ laser fuel /$I_2$ system creating (1) clean the laser fuel from the lasing by-products from the photolytically excited atomic iodine gain medium and (2) a uniform flow through the iodine gain medium resulting in excellent optical laser beam properties; i.e., negligible flow induced gas refractivity effects along the lasing optical axis.

These and man other objects and advantages of the present invention will be readily apparent to one skilled in the pertinent art from the following detailed description of a preferred embodiment of the invention and the related drawings.

BRIEF DESCRIPTION OF THE DRAWINGS

FIGS. 14(a)-(b) illustrate efficiency calculations for the cw atomic iodine laser.

DETAILED DESCRIPTION OF THE PREFERRED EMBODIMENT

Figure 1:
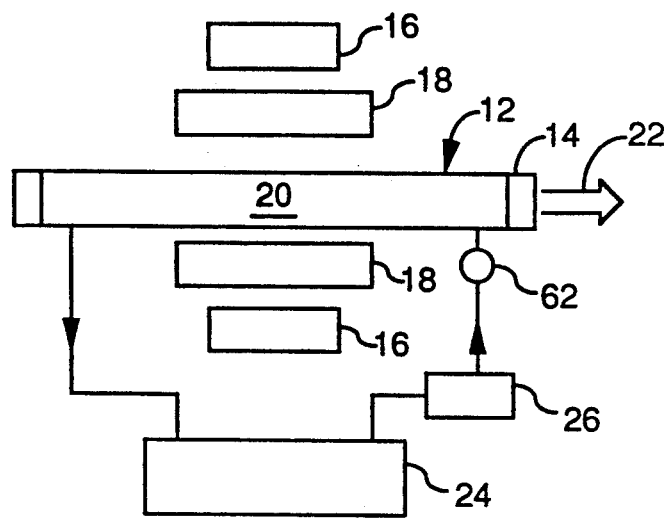
FIG. 1 illustrates by schematic the cw photolytic atomic iodine laser system.
Figure 7:
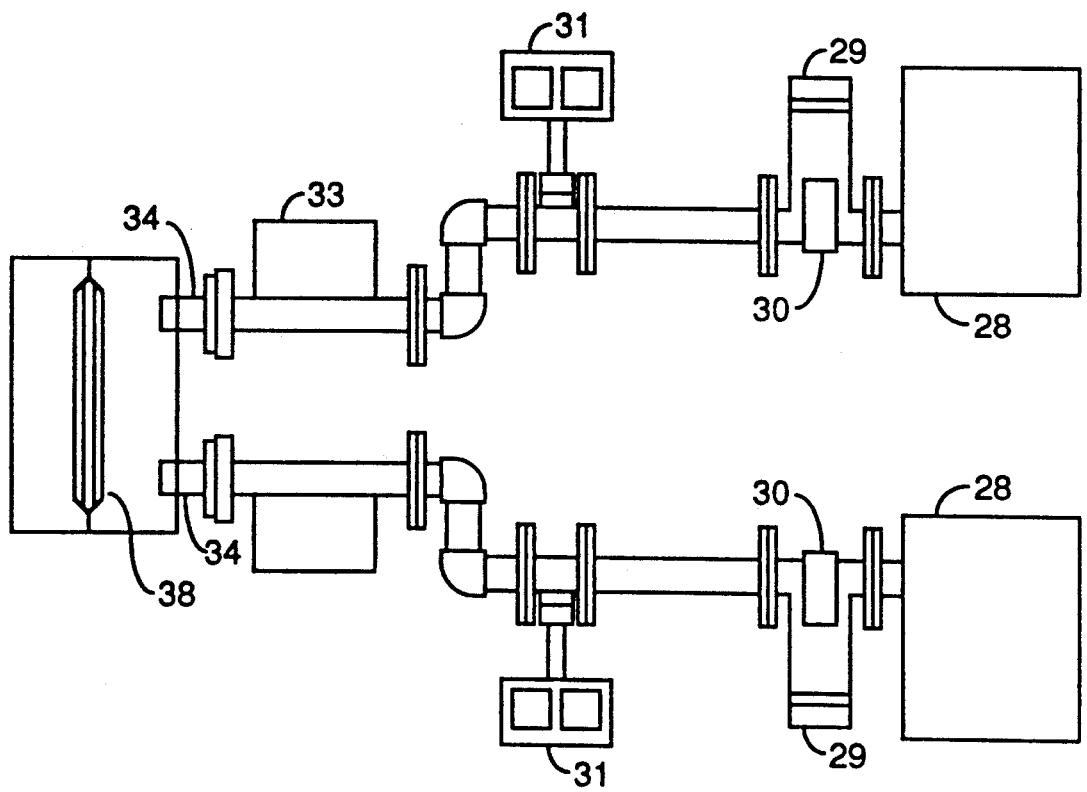
FIG. 7(a)-(b) illustrate the microwave apparatus for powering the lamps both experimentally and optimized.
Figure 7:
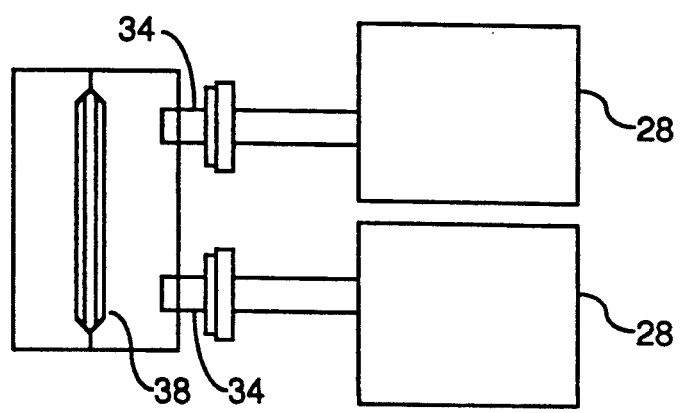

Referring to FIG. 1, a cw photolytic atomic iodine laser system 10 is shown schematically. The laser system 10 comprises a transverse gain cell 12, in greater detail in FIG. 3, with an optical resonator 14 thereabout, FIG. 13(a). A RF/microwave source 16, FIG. 7, outputs appropriate radiation to excite the UV lamps 18, FIGS. 3(a)-(b), which outputs UV radiation into the laser gain cell 12 wherein the UV radiation interacts with the lasing medium 20 therein. The lasing medium 20 outputs a desired wavelength of lasing radiation 22 through the resonator 14. The spent lasing medium 20 flows into a laser fuel system 24, FIG. 9, which cleans the fuel of undesired by-products. The cleaned fuel flows into a pump 26 which provides a desired fuel flow velocity. The laser fuel 26 selected for the present invention is atomic iodine.

Figure 2:
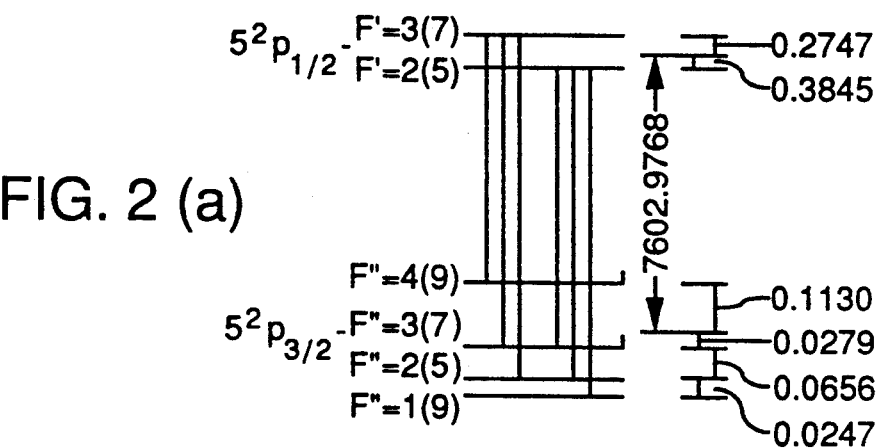
FIGS. 2(a)-(c) illustrate atomic iodine laser spectroscopy information.
Figure 2:
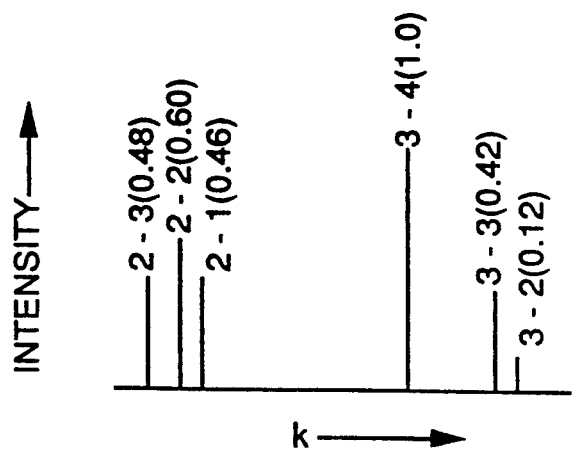
Figure 2:
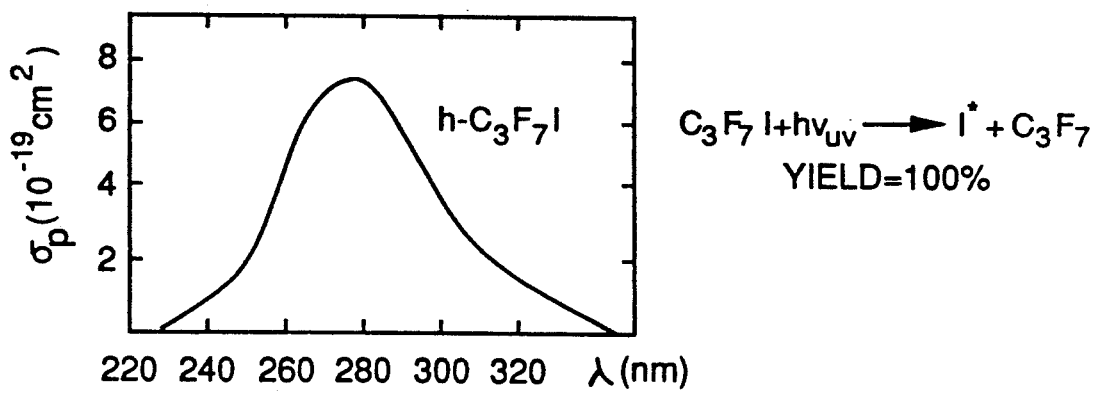

In iodine there exists a significant amount of hyperfine splitting of both the ground and the excited states. The selection rules for different transitions between hyperfine levels are $\Delta F=0$, $\pm 1$ with F' (upper level)=0→F'' (lower level)=0, not allowed. There exists $2J+1$ values for F; i.e., two for the upper-state and four for the lower-state levels of atomic iodine. In FIG. 2(a), these energy levels are depicted for the both the ground $5^2P_{3/2}(I)$ and the first excited $5^2P_{\frac{1}{2}}(I^*)$ states, along with their degeneracies (g=2F+1). Also shown in FIG. 2(b), the transitions governed by the above selection rules plus the relative intensities of each transition are shown. The dominant transition is F'=3 to F''=4. Table I lists the wavelengths in both micrometers and wave numbers ($k=1/\lambda$) in centimeters of each transition cited plus their A-coefficients.

With 240-320 nm UV (ultraviolet excitation radiation, $n-C_3F_7I$ (normal form) is photolytically excited into an excited iodine $5^2P_{\frac{1}{2}}$ atom and a free $n-C_3F_7$ radical specie with nearly 100% quantum yield. This photoexcitation cross section is given in FIG. 2(c). Other alkyl-iodides (e.g., $i-C_3F_7I$ and $C_3F_7I$) have similar high quantum yield values, but $n-C_3F_7I$ is used since it is easier to procure in the United States. Other forms of this alkyl-iodide like $iso-C_3F_7I$ are believed to have a higher effective reassociation rate back to the parent molecule $C_3F_7I$ since less $(C_3F_7)_2$ dimmers are formed. Hereafter, all citing of $n-C_3F_7I$ is denoted simply by $C_3F_7I$. The photolysis cross section peaks near 272 nm with a magnitude of $\sigma_p \cong 7.8 \times 10^{-19}$ cm². This cross section $\sigma_p$ can be used to

TABLE I

| Atomic Iodine Hyperfine Transition Characteristics | | | |
|---|---|---|---|
| | Wavelength | | A-coefficients |
| Transition F'→F''[a] | k(cm$^{-1}$) | λ(μm) | (sec$^{-1}$) |
| 2-3 | 7602.6202 | 1.315336 | 1.76 |
| 2-2 | 7602.6858 | 1.315325 | 2.20 |
| 2-1 | 7602.7105 | 1.315320 | 1.69 |
| 3-4 | 7603.1385 | 1.315246 | 3.67 |
| 3-3 | 7603.2794 | 1.315222 | 1.54 |
| 3-2 | 7603.3450 | 1.315211 | 0.44 |

[a]"F' is the upper state quantum number while F'' refers to the lower state quantum number.

establish the $C_3F_7I$ operating pressure for a specific cross sectional area of an iodine laser medium 20. Since the photolytic cross section extends over the 240-320 nm region, a mean approximate value of $4 \times 10^{-19}$ cm² provides a better estimate for the mean free path length calculations. Table II lists these mean free path lengths $l_p(=1/N\, l_p)$ for various $C_3F_7I$ pressures where N represents the $C_3F_7I$ density.

TABLE II

| Mean Free Path Lengths versus Pressure of n-C$_3$F$_7$I | |
|---|---|
| n-C$_3$F$_7$I Pressure (torr)[a] | Mean Free Path Length - $l_p$ (cm) |
| 5 | 15.3 |
| 10 | 7.67 |
| 15 | 5.11 |
| 20 | 3.83 |
| 25 | 3.07 |
| 30 | 2.56 |
| 35 | 2.19 |
| 40 | 1.92 |
| 45 | 1.70 |
| 50 | 1.53 |
| 55 | 1.39 |
| 60 | 1.28 |
| 70 | 1.10 |
| 80 | 0.96 |
| 90 | 0.85 |

TABLE II-continued

Mean Free Path Lengths versus Pressure of n-$C_3F_7I$

| n-$C_3F_7I$ Pressure (torr)[a] | Mean Free Path Length - $l_p$ (cm) |
|---|---|
| 100 | 0.77 |

[a]All calculations made assuming gas temperature of 23° C.

For a situation requiring uniform excitation by UV pumping from a single side, the mean free path of the UV radiation must be significantly larger than the gain medium's transverse dimension d, FIG. 3(c). Square or rectangular physical geometries having excitation from 2 or more sides require uniform pumping when $d \cong 4l_p$ where d=cavity width and $l_p=1/(N\sigma_p)$ with N the total $C_3F_7I$ gas density and $\sigma_p$ the mean photolytic cross section for UV pumping of $C_3F_7I$ producing excited iodine atoms. Establishment of uniform gain throughout the photolytically excited volume greatly simplifies constraints for the unstable resonators used in optimizing the extractable laser energy.

Once the $C_3F_7I$ molecules are photolyzed, various kinetic processes occur in the iodine gain medium as listed in Table III. See next page. There are many other kinetic mechanisms existing, but the list provided highlights the most important features. Temperature dependent rates which play a very significant role in the overall kinetics of cw photolytic iodine laser system are not included in this list. In the present invention no buffer gas was used. This list of kinetic processes emphasizes the photolytic excitation, quenching, "parent" molecule recombination, formation of $I_2$ by-product, and radiative/stimulated processes. Some processes are included to emphasize the $C_3F_7I$ laser fuel purity requirements. The performance of cw photolytic atomic iodine lasers is easy to demonstrate but the extractable power, however, can vary significantly due to impurities and the

TABLE III

Pertinent ctic Processes for cw Atomic Photonic Iodine Laser

| Reaction | Rate Coefficient[a] | Reference |
|---|---|---|
| 1. $RI + h\nu_{pump} \rightarrow R + I$ | $\sigma_p(max) = 7.8 \times 10^{-19} cm^2$ | 15, 16 |
| 2. $I^* \rightarrow I + h\nu_{rad}$ | $A = 7.7 sec^{-1}$ | 12, 13 |
| 3. $I^* \rightarrow I + h\nu_{laser}$ | $\sigma_{se} = 5.5 \times 10^{-18} cm^{2(b)}$ | 14 |
| 4. $I^*$ (diffusion) $\rightarrow I$ | $D(STP) = 0.009 cm^2 \cdot sec^{-1}$ | 19 |
| 5. $I + R \rightarrow RI$ | $4.7 \times 10^{-11}$ | 18, 21 |
| 6. $I^* + R \rightarrow RI$ | $7.9 \times 10^{-13}$ | 18, 21 |
| 7. $R + R \rightarrow R_2$ | $1.3 \times 10^{-12}$ | 18, 21 |
| 8. $I^* + RI \rightarrow I + RI$ | $2.8 \times 10^{-16}$ | 18, 21 |
| 9. $I^* + O_2 \rightarrow I + O_2^*(^1\Delta g)$ | $2.5 \times 10^{-11}$ | 22 |
| 10. $I^* + H_2O \rightarrow I + H_2O + heat$ | $9.6 \times 10^{-12}$ | 23, 24 |
| 11. $I^* + N_2 \rightarrow I + N_2 + heat$ | $5.2 \times 10^{-17}$ | 25 |
| 12. $I^* + I + RI \rightarrow I_2 + RI$ | $3.8 \times 10^{-31}$ | 18 |
| 13. $I^* + I + I_2 \rightarrow 2I_2$ | $3.7 \times 10^{-30}$ | 26 |
| 14. $I^* + I_2 \rightarrow I + I_2$ | $9.9 \times 10^{-12}$ | 25 |

[a]Rate coefficients have dimensions $(cm^3/molecule)^n/sec$ where n = 1 for two body reactions and n = 2 for three body reactions described in reactions 1–4.
[b]Evaluated assuming only Doppler broadening (T = 300° K.). At higher pressures, the effects of pressure broadening on $\sigma_{se}$ must be included.

photolytic by-product $I_2$. Elimination of $O_2$, $H_2O$, and $I_2$ is essential to minimize these excited iodine quenching processes. In the absence of such impurities, only two quenching processes for the excited iodine atoms exists. These are the re-association of the parent molecule (reaction 6 of Table III) and quenching by the parent molecule (reaction 8). Hence, the quenching processes are $$I^* + R \rightarrow RI \tag{1}$$

$$I^* + RI \rightarrow I + RI \tag{2}$$

having respectively rate constants of $7.9 \times 10^{-13}$ and $2.8 \times 10^{-16}$ $cm^3 \cdot sec^{-1}$. I and $I^*$ represent the iodine upper, excited state while I denotes the lower, unexcited iodine level between which the 1.315 micron lasing transition occurs. An appreciation of these effects can be acquired using typical $C_3F_7I$ operating pressure of 10 to 30 torr and 2%/cm gain coefficients. Using the iodine stimulated emission cross section, $5 \times 10^{-18} cm^2$ at 300 MHz pressure broadening gives an excited iodine density of $10^{-16} cm^3$. For these conditions in an iodine gain medium, the $I^*$ loss rates are respectively 7900 and 274 $sec^{-1}$. During lasing, stimulated emission extracts the excited iodine energy before these quenching processes can create any detrimental effects.

The $I^*$ quenching processes due to $O_2$, $H_2O$, and $N_2$ impurities are particularly important since all of the gases can easily be dissolved in liquid $C_3F_7I$. To emphasize their detrimental effects, it is assumed that the quenching rate from these impurities must be less than 1/10 of the lowest non-purity quenching rate process, namely $C_3F_7I$ quenching, reaction (8) in Table III. Referring to the above analysis, the concentrations of $O_2$, $H_2O$, and $N_2$ must, respectively, be less than $1.83 \times 10^{13}/cm^3$ (0.5 microns), $4.6 \times 10^{14}/cm^3$ (13.6 microns), and $8.7 \times 10^{19}/cm^3$ (3.26 Atm). Consequently, removal of all $O_2$ and $H_2O$ impurities from the laser gas $C_3F_7I$ is mandatory. $N_2$, however, produces negligible quenching. Any significant concentrations of $N_2$, however, will decrease the stimulated emission cross section due to pressure broadening.

Another major kinetic quenching process in photolytic atomic iodine lasers is the $I^*$ quenching by the photolytic by-product $I_2$ (reaction 14), namely $$I^* + I_2 \rightarrow I + I_2 + heat \tag{3}$$

which has a large quenching rate constant, approximately $10^{-11}$ $cm^3 \cdot sec^{-1}$. The effect of this quenching process will increase during the photolytic UV pumping pulse because $I_2$ is a by-product of the irreversible recombination channel of the photolyzed $C_3F_7I$. Since the only mechanism to destroy the $I_2$ as it is formed in the lasing medium is the small dissociation by 500 nm radiation, flow must be used to transfer it from the laser gain region for subsequent removal. The rate coefficients for the two possible ternary iodine dimerization processes are listed in Table III (processes 12 and 13) and assumed to be equal for each of the species M ($C_3F_7I$ and $I_2$). The formation of $I_2$ while $C_3F_7I$ is being excited in the gain medium will eventually increase to a value such that significant quenching by the above reaction will become important. Consequently, transverse flow becomes important.

Important to all atomic iodine lasers is the effect of gain medium density fluctuations on the quality of the output laser beam. The ability to obtain a near diffraction-limited optical beam critically depends on the magnitudes of two parameters; namely, the spatial variation of these gas density fluctuations characterized by the gain medium's $\Delta N/N$ or $\Delta \rho / \rho_0$ variation and the refractivity, $\Delta n$, or polarizability $\alpha$/Gladstone-Dale constant $\beta$, of the individual gaseous species present. $\beta$ and $\alpha$ are related as $\beta = 2\pi \times \alpha \times N_s$ where $N_s$ is the particle density at STP conditions, $2.68 \times 10^{19}/\text{cm}^3$ and $\Delta n = 2\pi \alpha N$ with N equal to the total number density of the gas being examined. Table IV lists these parameter for species present in the pulsed photolytic iodine gain mediums. The magnitude of each of these quantities dictate the non-constant cross-sectional phase shift difference, $\Delta\phi$, an optical beam experiences while propagating through a medium of

TABLE IV

| $\lambda(\text{Å})$ Gas | Polarizabilities ($\alpha$) and Gladstone-Dale Constants ($\beta$) for Various Gases | | |
|---|---|---|---|
| | 4880 | 5145 | 13150 |
| $H_2O$ | 1.50 (2.526) | 1.55 (2.610) | 1.49 (2.509) |
| $N_2$ | 1.78 (2.997) | 1.77 (2.980) | 1.77 (2.980) |
| $O_2$ | 1.62 (2.728) | 1.62 (2.728) | 1.57 (2.644) |
| $I_2$ | a | a | 12.5 (21.049) |
| $C_3F_7I$ | 12.0 (20.207) | 12.1 (20.375) | 11.6 (19.533) | a. Absorption of the laser radiation at this particular wavelength by $I_2$ prevented any interferometric measurements.

length L with spatially varying density and is expressed as $$\Delta\phi = \frac{1}{\lambda} \frac{\Delta\rho}{\rho_o} \beta \frac{\rho_o}{\rho_s} L = \frac{1}{\lambda} \frac{\Delta N}{N_o} 2\pi\alpha \frac{N_o}{N_s} L = \frac{2\pi}{\lambda} \alpha(N - N_o)L \quad (4)$$

where $\Delta\rho$ is the gas density disturbance relative to equilibrium conditions and equal to $(\rho - \rho_o)$ with $\rho$ is the perturbed gas density and $\rho_o$ the equilibrium, nonperturbed gas density value. $\rho_s$ is the gas density at STP conditions and $\Delta N = N - N_o$, the particle density difference. Assuming a maximum single pass phase shift across the gain media less than 1/10 wave over a 200 cm gain length projected as scalable gain reported below; Eqn. (4) relates $\Delta\rho/\rho_o$ must be less than $0.98 - 5.85 \times 10^{-3}$ when the initial operating $C_3F_7I$ pressure of 10-60 torr is taken. Such a requirement can easily be established and is intimately associated with the excellent unstable beam quality reported below.

Figure 4:
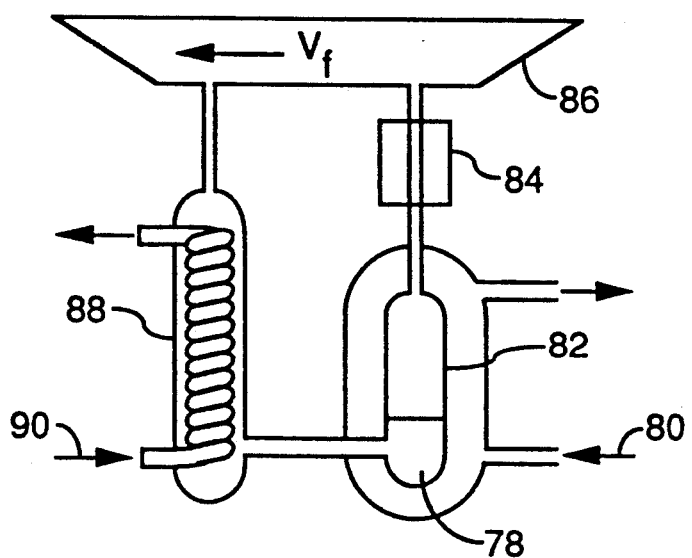
FIG. 4(a) illustrates the two-stage $C_3F_7I$ iodine ($I_2$) removal/passive flow system and FIG. 4(b) the apparatus for refilling cooled $C_3F_7I$ iodine ($I_2$) into the removal/passive laser fuel system.
Figure 4:
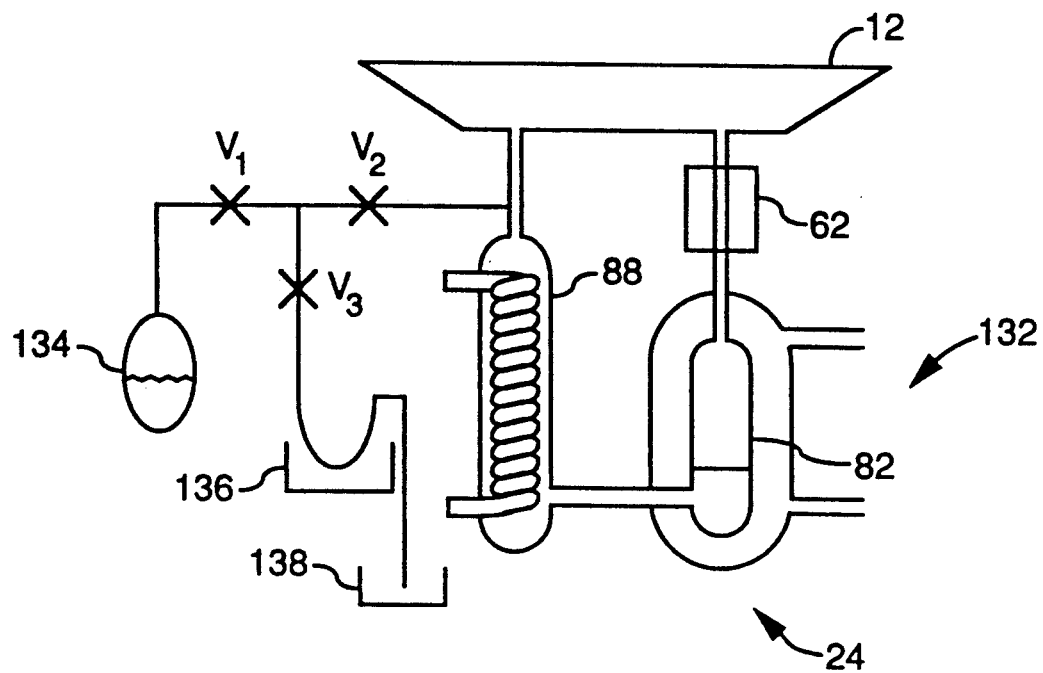
Figure 5:
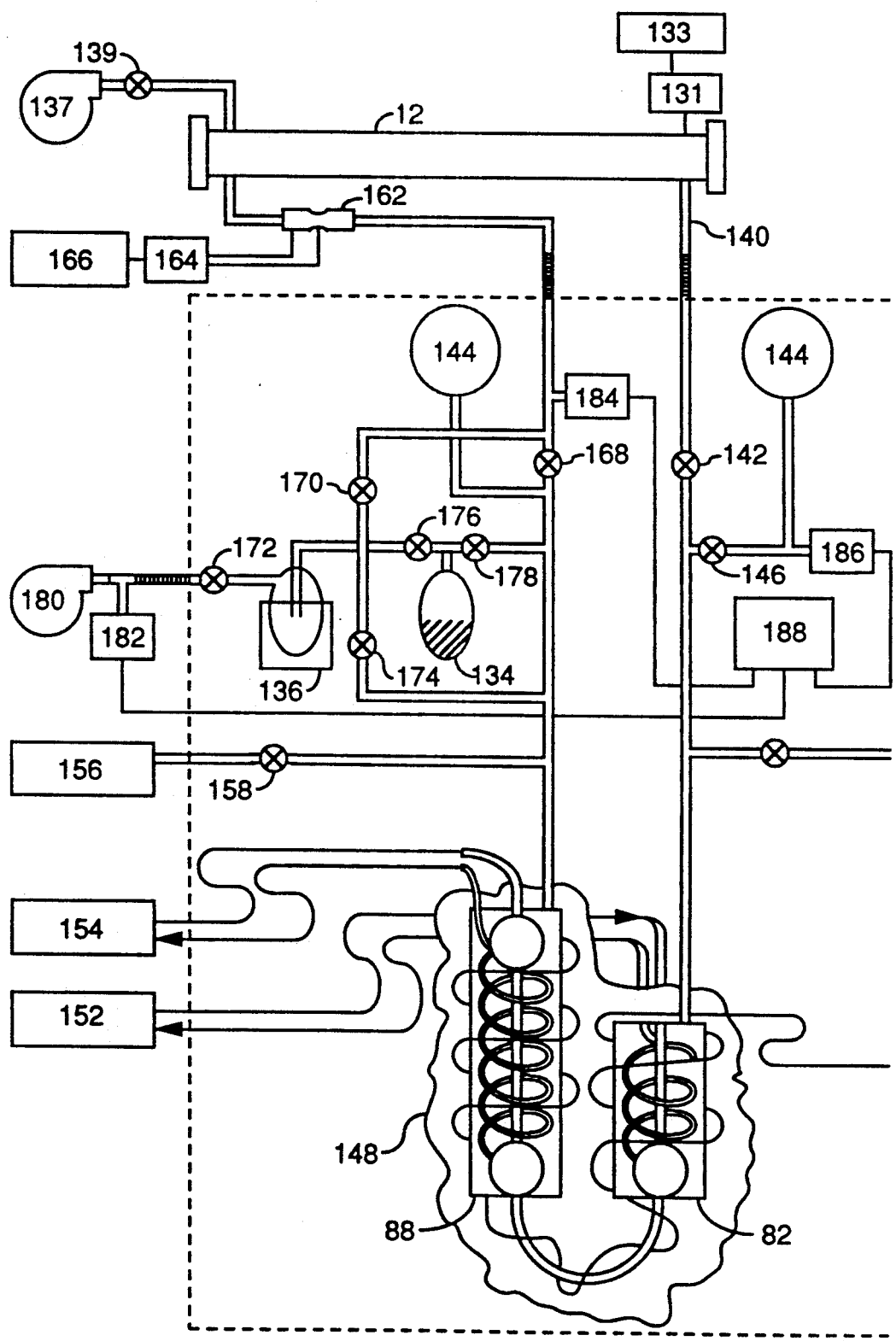
FIG. 5 is a detailed schematic of the cw atomic iodine flow system employing passive evaporative/condensative $I_2$ removal system.
Figure 6:
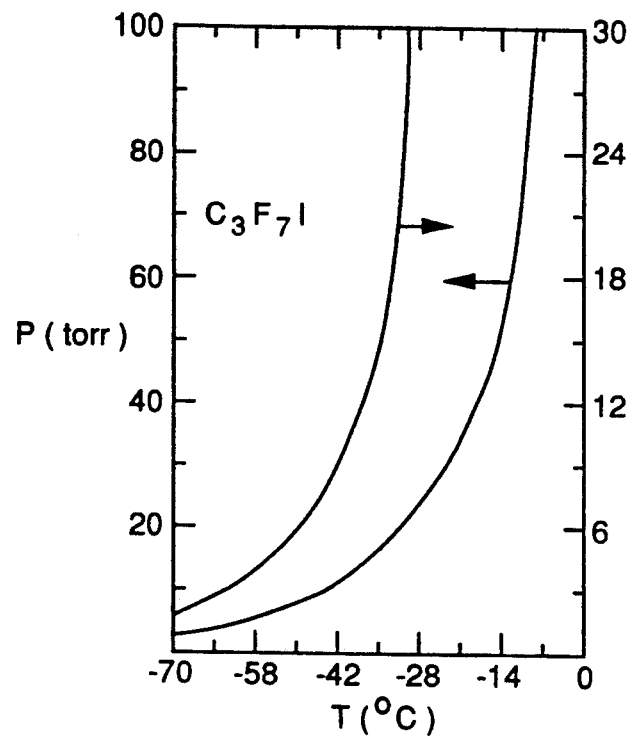
FIG. 6(a)-(b) illustrate vapor pressure curves.
Figure 6:
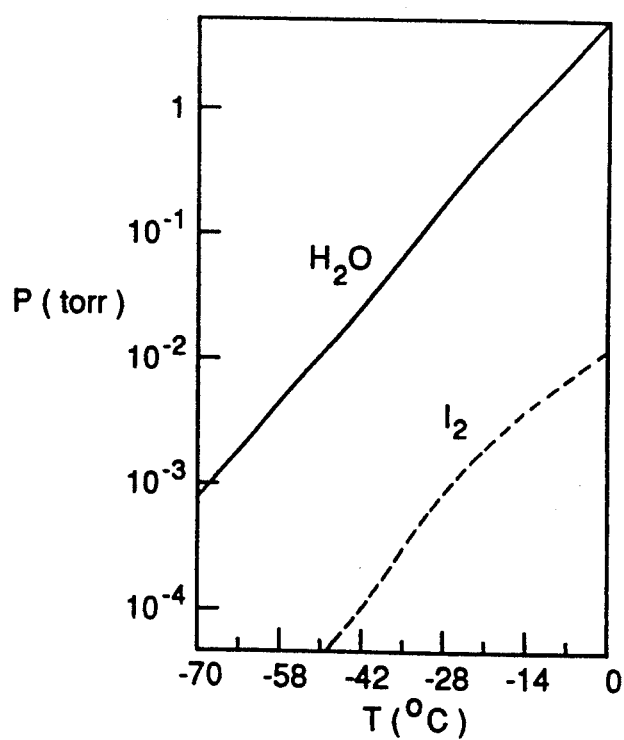
Figure 8:
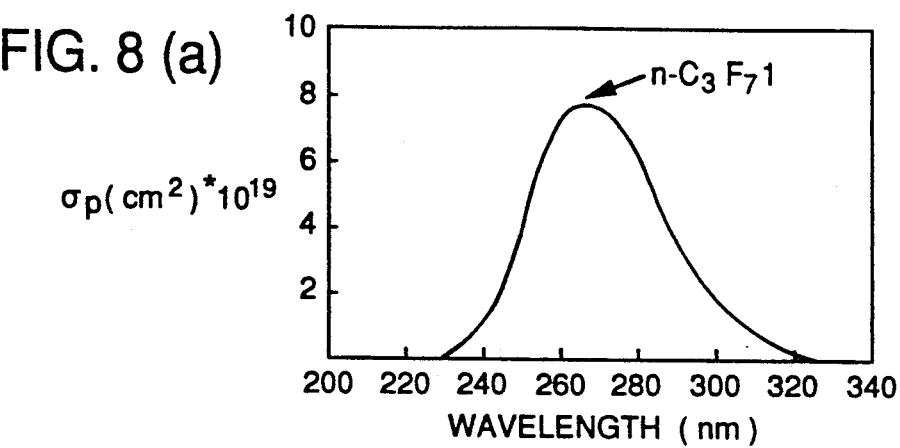
FIGS. 8(a)-(b) illustrate Ozone ($O_3$) versus $C_3F_7I$ absorption cross section for the wavelength range photolytically pumping $C_3F_7I$ producing excited iodine upper laser level.
Figure 8:
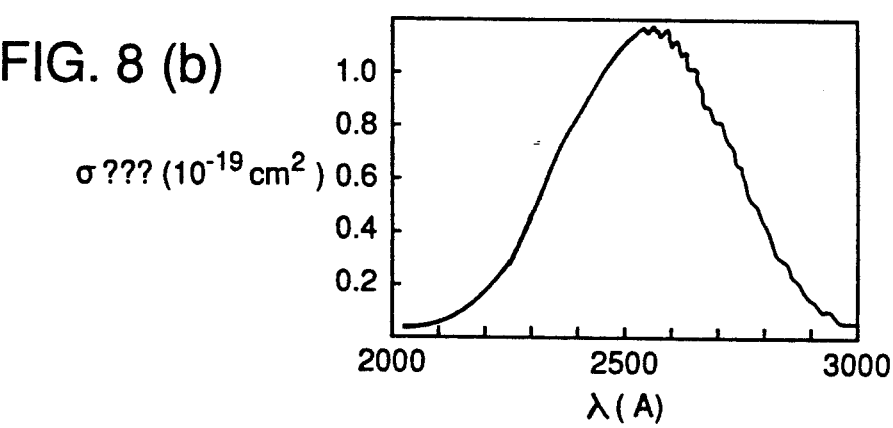

As seen in FIG. 3(a), the RF/microwave source 16 may comprise a magnetron 28, a isolator/circulator 30 and a typical matching ¼ wave tuning stub/waveguide 32. Another configuration would employ the magnetron and coupler to the lamp. As seen in FIG. 3(b), the RF/microwave source 16 is connected to the lamps 18 by means of a coupler 34. The $C_3F_7I$ pressure and flow velocity were controlled by a closed cycle alkyl-iodide laser supply system 24 as seen in FIGS. 4, 5, and 8. Liquid DMPS coolant enters inlet 17 and flow around the lamp 36 contained by a quartz jacket 19 and out outlet 21. The vapor pressures of $C_3F_7I$ and $H_2O$ /$I_2$ shown in FIG. 6 establish the temperature operation of this condensative/evaporative $I_2$ removal system.

The laser system 10 employs an elliptical reflector 36, FIG. 3(a) in which a microwave excited, Hg high pressure ($\approx$2-3 Atm) lamp 38 is placed at one focus and the iodine gain medium 20 is placed below it within the gain cell 12. This elliptical reflector 36 collimates the UV radiation from lamps 38 into the gain region 40. A top view of the gain cell 12 is shown in FIG. 3(c). It has a single input 42 and exit port 44 (0.95 cm diameter) at each end for connection to the closed cycled $C_3F_7I$ flow system. Symmetrically configured, a flow channel 46 expands to 25 cm wide and 2.5 cm high on both the upstream and downstream sides of an optical axis 48. Two (2) cm on both sides of the optical axis 48, it has a constant height (2.5 cm) and width (25 cm). This shape gives an active lasing length of 25 cm. Normal to the flow direction, parallel to the optical axis, and even with the top of the flow channel is placed a 5 cm $\times$ 28 cm quartz flat (0.95 cm thick) to transmit the UV photolysis radiation into the transversely flowing $C_3F_7I$ lasing fuel. To acquire good vacuum sealing integrity of this quartz window 50 to the flow channel 46, a configuration in which the quartz window 50 was sealed to an Al structure with an ultraviolet (UV) radiation compatible silicone rubber RTV flexible sealant (GE RTV 102) gave the best result. When this silicone sealant was used, the surfaces on both the quartz window and the aluminum support structure were first cleaned with a silicone primer (GE SS4004) to improve the sealant's adhesion to the surfaces. In addition, Al foil was placed at the surface of the silicone rubber seal to prevent its degradation from exposure to high intensity UV radiation. The transverse flow section was water cooled, not shown, to minimize any pyrolysis effects on the $C_3F_7I$ laser fuel.

For flow uniformity, a diffuser 52 was placed upstream next to the entrance port 42. The diffuser 52 was made from an open cell aluminum foam (Energy Research and Generation, Inc.,) having approximately 20 pores/inch and a density 6 percent of solid Al. This diffuser 52 served to distribute the gas flow across the channel. At approximately 2 cm upstream from the optical axis in the straight flow section was placed another piece of aluminum foam for a straightener 54. Its purpose was to straighten the flowing $C_3F_7I$ streamlines across the lasing medium. It also provided an additional beneficial feature of preventing any UV radiation from propagating upstream. This restriction was very important since such UV radiation produced both ground (I) and excited state (I*) iodine atoms. Their production could cause subsequent absorption and formation of the I* - quenching photolytic by-product $I_2$ and in addition create a loss of $C_3F_7I$. For similar reasoning, an Al foam blocker 56 was also placed approximately 2 cm downstream from the optical axis 48 Utilizing such flow straighteners on both sides of the optical axis greatly reduced the production of $I_2$ molecules as observed in the evaporator/condenser sections 58 and 60 of the closed cycle laser fuel system 24. No quantitative value for this reduction was determined, however. In addition, these pieces of Al foam greatly reduced any flow instabilities. The Venturi tube used to measure the flow velocity of $C_3F_7I$ had a factor of five improved gas flow velocity stability. The gain region 40 had either flat or Brewster windows which were commercially polished quartz with marginal surface quality ($\lambda/2$) over the 2 cm diameter surfaces. Such marginal quality windows, however, did not significantly affect the laser's output power performance. The laser mirrors were placed at both ends of the iodine gain region 40 for the resonator 14.

Figure 3:
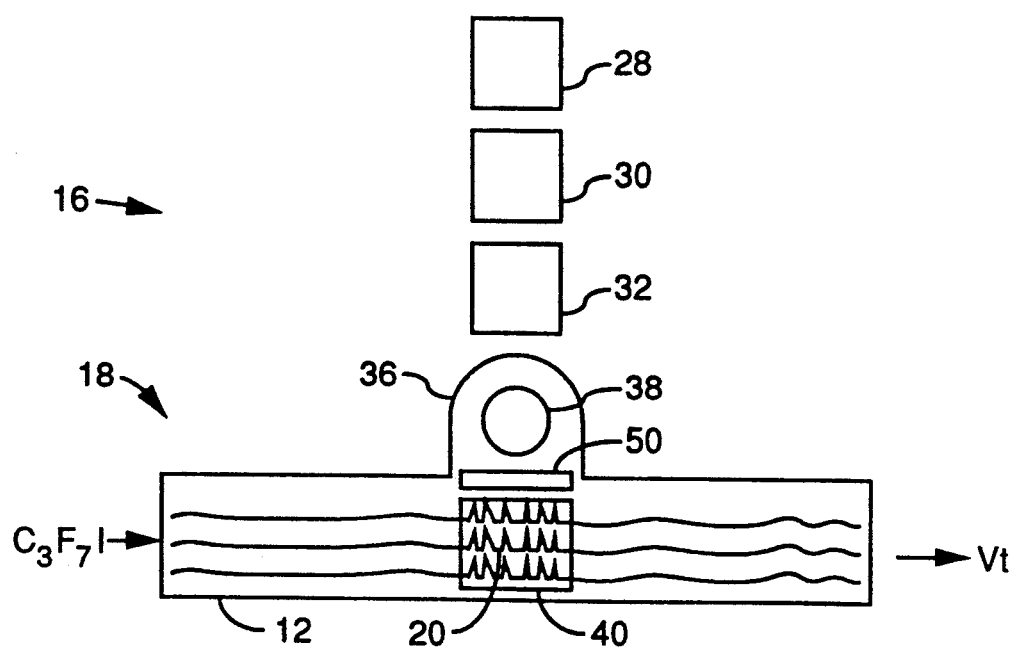
FIG. 3(a) illustrates by sideview the microwave excited electrodeless lamps and the coupling of UV radiation into the transverse flowing iodine gain medium.
FIG. 3(b) illustrates by cross-sectional view the double ended, UV lamps excited with 2.45 GHz microwaves while concentrically cooled with dimethyl polysiloxane.
FIG. 3(c) illustrates by top view the transverse flow section. Air cooling can be substituted for liquid cooling.
Figure 3:
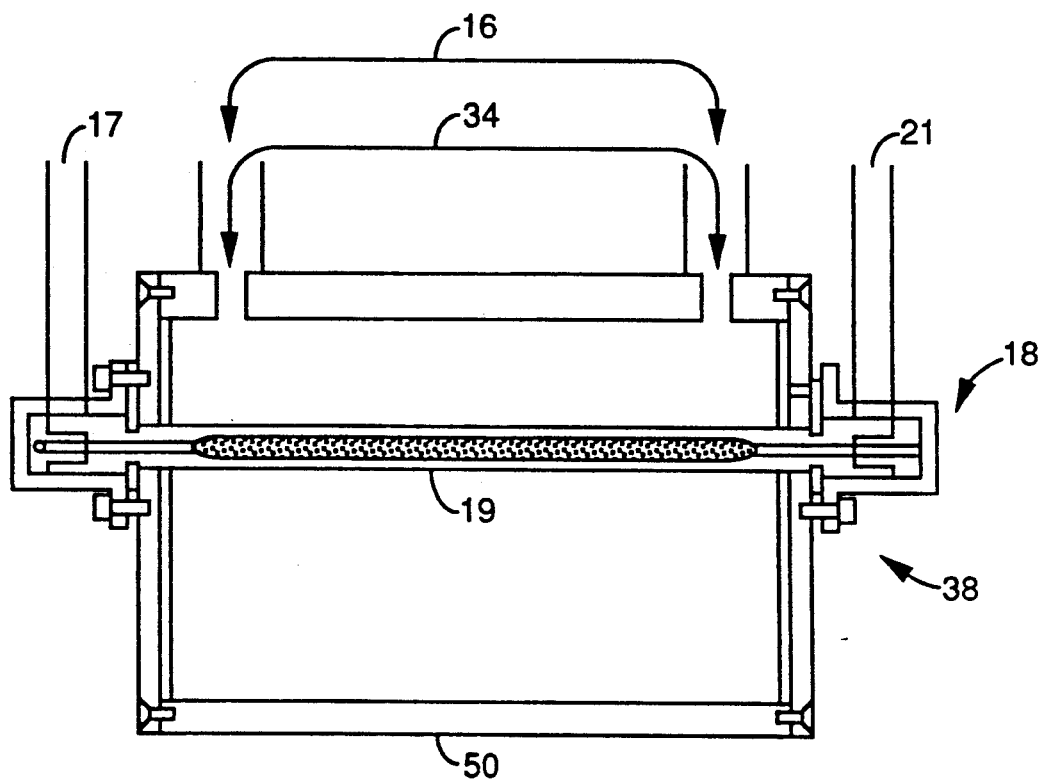
Figure 3:
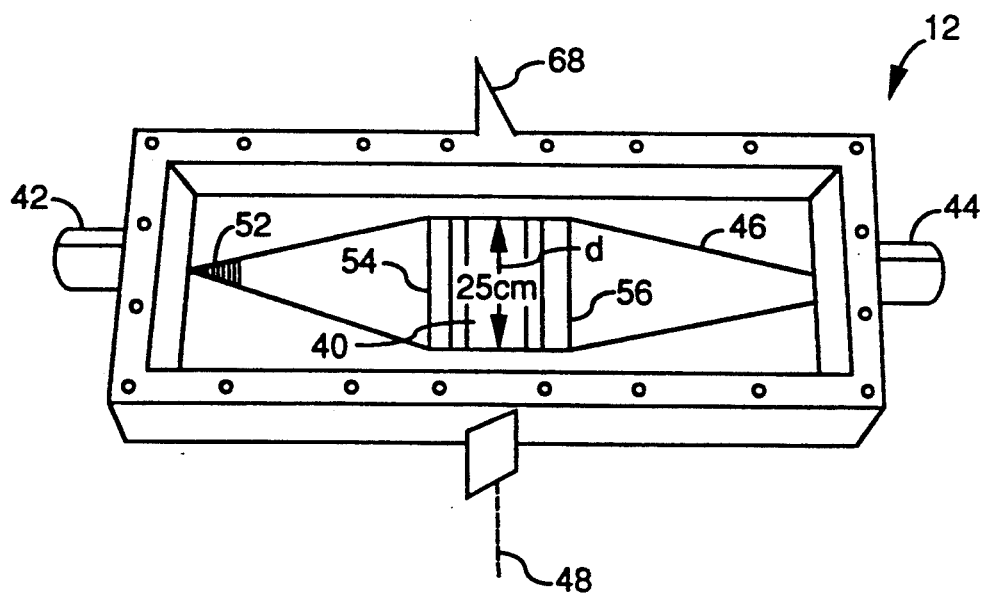

The continuous wave lasing at 1.315 microns was produced by the UV photolytic excitation of $C_3F_7I$ as shown in FIGS. 1 and 3. Details of the lamp 38 and reflector 36 are shown in FIGS. 3(a)-(b). The quartz UV lamp 36 was typically one centimeter in diameter, operated at medium Hg pressures (slightly greater than one atmosphere), and excited by two cw 1.5 KW microwave magnetrons 28. The lamp 36 yielded much more useful UV radiation in the 230 to 320 nm band for the $C_3F_7I$ photolysis and was 2.5 times longer than the d.c. Hg capillary lamp used previously. Consequently, it was possible to achieve a factor of 1000 higher laser power levels with this cw atomic iodine laser 10. Each of the microwave sources 16 used a 1.5 kilowat Hitachi magnetron 28 which was water cooled and powered by a separate, d.c., low ripple (<1%) power supplies. These Hitachi magnetrons 28 operated at 2.4 GHz and were capable of operating at 3 kilowatt cw microwave output powers. FIG. 7(a) shows the detailed microwave equipment used to excite these electrodeless, UV plasma lamps 38. Additional apparatus shown connected thereto are the dummy load 29, power meters 31 and stub tuners 33. FIG. 7(a) reflects experimental setup while FIG. 7(b) reflects the optimized RF/microwave coupling of the source 28 to the UV lamps 38.

Originally, these UV plasma lamps 36 were cooled with air using a 150 cfm air blower. Unfortunately this blower induced mechanical vibrations into the optical system as exhibited by the poor laser amplitude stability. To overcome this vibrational problem, these microwave excited UV plasma lamps 36 were liquid cooled with dimethyl polysiloxane (DMPS), FIG. 3 (b), resulting in good laser stability by greatly reducing the high flow velocity air induced mechanical vibrations. See U.S. Pat. Nos. 5,008,593 and 5,055,741 which are incorporated by reference. In addition, the region encompassed by the elliptical reflector 36 and the UV transmitting window 50 of FIGS. 1 and 3(a)–(b) were purged with $N_2$ to eliminate any $O_3$ absorption. Such ozone ($O_3$) absorption overlaps the $C_3F_7I$ absorption as FIG. 8 shows.

The electrodeless microwave lamps producing the necessary UV radiation to promote atomic iodine laser inversion can be filled with Hg at high pressures with and without "doping" including other metal vapors to tailor their spectral emission to that of the absorptive cross section of the alkyl iodides like $C_3F_7I$. Other gas fills may be the inert gas halides (e.g., XeBr, XeCl mixed with halogens like $Br_2$ and $Cl_2$) and/or BCl (from $BCl_3$). Other possible metal vapor based fills for the lamps are Ag-halides (e.g., AgCl), Al-halides, B-halides (via use of $BCl_3$, etc.), Bi-Se(S or Te), CSe(S or Te), Ga-halides, GeS/Se/Te, NS/Se/Te (via $N_2$ mix with sulfur, selenium, and/or sulfur), $P_2$, PN (in mixtures of $N_2$ and phosphorous), PO, PbS/Se/Te and Pb-halides, SO (plus SeO and TeO), and SbTe (via mixtures of Sb and Te plus possibly S or Se).

Figure 9:
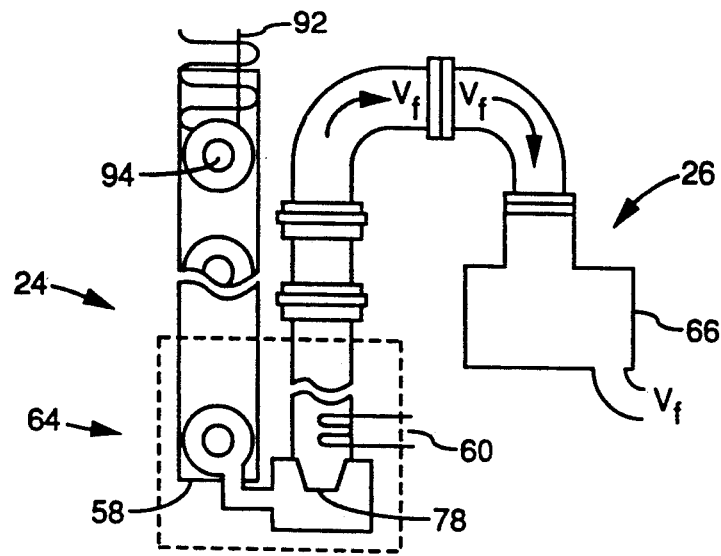
FIG. 9 illustrates the $C_3F_7I$ gas flow condensative/evaporative system coupled to a turbo-molecular blower.

The $C_3F_7I$ laser fuel 26 was prepared and generated by the closed cycle/partial "blowdown" system shown in FIGS. 4,5, and 9. In FIG. 4 and in particular FIG. 4(b), the $C_3F_7I$ gas flow system is referred to as a closed cycle/partial "blowdown" system 132 since it can operate as either a purely closed cycle system (Valve $V_2$ closed) or as a closed cycle/partial "blowdown" system (valves $V_2$ and $V_3$ open with valve $V_1$ closed). In the closed cycle mode, this system generated a constant flow of gaseous $C_3F_7I$ with a flow velocity greater than 2 m/sec while simultaneously "scrubbing" the photolytic $I_2$ by-product from the $C_3F_7I$ gas. The flow velocity, was determined using a Venturi tube flowmeter 62 between the laser fuel system 24 and the laser gain cell 12 as shown n FIG. 1. Very clean and constant density generation of gaseous $C_3F_7I$ was acquired with this system. Typically, 500 to 1000 grams of the $C_3F_7I$ laser fuel was used with less than 10% final dissociation into by-products $I_2$ and $C_6F_{14}$ for several weeks of continual use. The partial open cycle "blow-down" configuration was employed to increase the $C_3F_7I$ flow velocity relative to a passive evaporative/condensative $I_2$ removal system and thus reduce the "residence" time of the heated $C_3F_7I$ gas and the photolytic by-product $I_2$ inside the lasing region. For the latter mode of operation, the evaporator and condenser sections 82 and 88, respectively, still operated but enhanced flow velocity through the gain cell 12 was produced by opening the valves $V_2$ and $V_3$ in FIG. 4(b). FIG. 4(b) includes a $C_3F_7I$ reservoir 134, a liquid nitrogen trap 136 and a forepump 138. FIG. 4(a) shows a closed cycle fuel system which operates at a fixed flow velocity. Valve $V_1$ was always kept closed during this operational mode and only used to add more $C_3F_7I$ laser "fuel" to the closed cycle system 132. The $LN_2$ cold trap condensed the $C_3F_7I$ at a much colder temperature than the condenser ($-40°$ C.) thus creating the enhanced flow velocity through the laser cell 12. Virtually all of the gas flowing through valve $V_3$ (namely $C_3F_7I$ and $I_2$) was condensed in this $LN_2$ cold trap 136. It was also expected that the other photolytic by-product $C_6F_{14}$ would be condensed but it cannot be assured since its vapor pressure is not known. A Sargent-Welch 1402 15 cfm forepump 138 was used to remove any gases not condensed in the $LN_2$ cold trap. Weighing the liquid $C_3F_7I$ before and after each lasing run (typically 3–5 minutes) gave virtually no difference, hence indicating the trap condensed the majority of the $C_3F_7I$ and its by-products (mainly $I_2$). This configuration increased the achievable laser power by nearly a factor of two as will be discussed in the next section.

FIG. 5 further illustrates the apparatus of FIG. 4(b). In FIG. 5, the laser gain cell 12 has a pressure measuring thermocouple 131 connected to a vacuum gauge 133. Further a vacuum pump 137 with a shut off 139 is connected to the cell 12. On a cavity inlet line 140 is also a shut of 142. An absolute pressure gauge 144 is connected to the inlet line 140 by shut off 146. The inlet line 140 is further connected to the evaporator section 82 which receives the liquid from the condenser section 88. Both of these are surrounded by a thermal blanket 148. Chillers 152 and 154 operate on the evaporator section 82 and the condenser section 88, respectively. A scrubber 156 is connected via a shut off 158 to a cavity outlet line 160. After lasing the gas passes through a venturi 162 for measuring flow velocity connected by a differential pressure sensor 164 to a pressure gauge 166. As previously noted, the fuel reservoir 134 and the cold trap 136 are connected into the outlet line 160 via shut off 168 to 178. A vacuum pump 180 is also connected therein. Pressure measuring thermocouples 182, 184 and 186 are connected to a vacuum gauge 188 for appropriate measurement.

FIG. 9 shows the $C_3F_7I$ condensative/evaporative $I_2$ removal system 64 coupled to a turbo-molecular blower 66. This blower 66 produced a much more stable flow velocity through the laser cavity at any flow velocity between 1–40 meters/second for any $C_3F_7I$ gas pressure between 5 to 100 torr. As seen therein, liquid $C_3F_7I_2$ solution 78 is evaporated in the evaporator section 60 and flows through the blower 66 into a laser cell, not shown, and then returns at point 94 wherein cooling coils at about $-40$ degrees C 92 assist in turning the gas into a liquid in the condensative section 58 operating at $-40$ to $-60$ degrees C. The system is similar to that shown in FIGS. 4,5 except the flow velocity is established and controlled by the blower 66.

On both ends of the laser gain cell 12 were placed Brewster windows 68 (either quartz or BK7 glass) having a λ/10 optical surface quality and 5 mm diameter apertures. Originally, these windows were purged with a small flow of $C_3F_7I$ from the closed cycle system to remove any stagnant gas, but later it was observed that such flow was unnecessary. Different types of resonators 14 were used. Typically, a 10 meter, 99.9 percent reflector at 1.315 μm was used along with a flat having output couplings of 1 to 5 percent. The mirror separations were typically 50 cm. In addition, a resonator 14, FIG. 10, consists of a flat output coupler $M_1$ 93 receiving a beam 102 through an iris 100 from a first internal lens f1 99 from a second internal lens 96. The gain medium 20 outputs energy onto a curved or flat 100% reflecting mirror $M_2$ 98 onto the second lens f2 96 having an anti-reflection coating at 1.315 m and a spherical surface figure better than λ/10 was used. This type of resonator 14 expanded the beam size in the gain region while oscillating in only the $TEM_{00}$ fundamental transverse mode. To assure lasing on line center, a Lansing Model 80.214 active resonator feedback system having a piezoelectric crystal (PZT) for one mirror mount was used.

Lasing at 1.315 μm was demonstrated using the microwave excited lamps 36. Once the $C_3F_7I$ gas (10–60 torr) was flowing, lasing occurred 30 to 60 seconds after the microwave excited lamps 36 were turned on. The time delay was attributed to the time required for the high pressure Hg arc lamp to achieve equilibrium operating conditions. The measured flow velocity was approximately 2 meters/seconds using this closed cycle system. The optimum $C_3F_7I$ operating pressure was in the range of 12 to 30 torr independent of closed or partial open cycle "blowdown" operation. The laser output was multi-mode having a total "spotsize" of approximately 2 cm. Focusing the output beam resulted in easily burning paper, wood, and plexiglass. Using the maximum laser output of 5.5 watts gives an overall efficiency of 0.4%. By optimizing the extraction of laser energy, efficiencies of 1% would likely be demonstrated.

An examination of the used gas after a typical run showed that the fuel was being dissociated since solid $I_2$ (approximately 3–5% after several days of operation) was observed in the liquid fuel. The presence of this strong quencher of excited iodine significantly affects the ultimate performance of the atomic iodine laser and therefore was an additional reason why the flow velocity within the laser cavity had to be increased. All of these results strongly suggest that powers much higher than the 5.5 watts may be easily achieved by increasing the $C_3F_7I$ flow velocity and exciting the gain medium from both sides.

Figure 11:
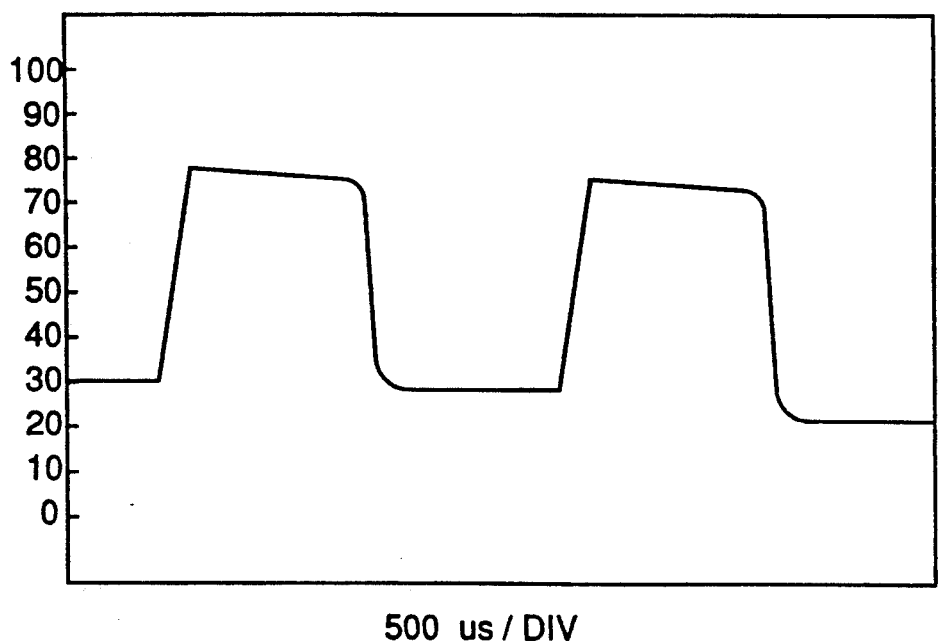
FIG. 11 illustrates the chopped laser output using an internal telescope inside the stable resonator.

The maximum outcoupling for the iodine laser that still allowed lasing was 50%. This implied that there existed an average small signal gain coefficient greater than 2%/cm over an excitation length of approximately 25 cm. Finally, in FIG. 11 is shown a typical laser output amplitude modulated by a chopping wheel. By using water cooled magnetrons, greatly improved laser amplitude stability resulted.

Figure 10:
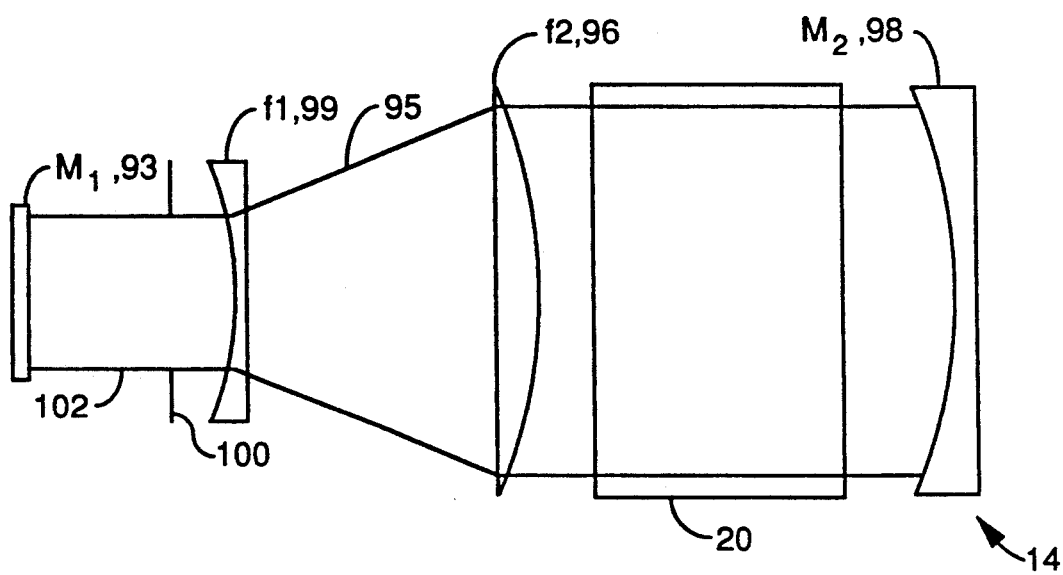
FIG. 10 illustrates a stable resonator with internal telescope for higher, output $TEM_{oo}$ mode laser power by increasing the beam size through the iodine gain medium.

Besides the laser amplitude stability, the other important aspect of a cw atomic iodine laser is the operating frequency. For the atomic iodine laser the most critical issue is which and how many hyperfine transitions are oscillating. It was determined that oscillation on only the strongest $F'=4$ iodine hyperfine transition occurred, as detected by a Fabry-Perot interferometer. More detailed examination showed that only one longitudinal mode oscillated in the $F'=3$ to $F''=4$ hyperfine transition. A PZT crystal drive was placed behind one mirror to frequency stabilize the laser on the peak of the gain profile. It was also used to change the laser cavity length (typically 50 cm) in order to scan the iodine gain profile. Such a scan illustrates a homogeneous gain profile. This behavior was expected since the inhomogeneous Doppler linewidth is only 250 MHz compared to homogeneous pressure broadened linewidth of 300 to 400 MHz. $C_3F_7I$ has a broadening coefficient of 20 MHz/torr, and the typical operating pressure is 15 to 20 torr. When a lock-in stabilizer was used with the PZT crystal, very good amplitude stability was obtained as shown by FIG. 11. To improve the extraction efficiency from this device, a resonator consisting of two flats, M1 and M2, and an internal lens, f1 and f2, was used to increase the mode size to match the gain medium's cross-sectional area as shown in FIG. 10. As with the longitudinal flowing atomic iodine laser, this technique worked very well and produced only the $TEM_{00}$ mode laser power was observed.

A rectangular volume 10 cm.×10 cm.×2 m is capable of producing a 1 kilowatt photolytic cw laser using a simple 1:1 scale-up of the reported iodine performance of 55 watts/liter. The 10×10 $cm^2$ cross sectional area with a 2 meter length will provide a 1 kilowatt output. This 20 liter volume should produce 1.1 kilowatts and 2.2 KW if excited from the two opposite sides.

By ganging 8 lamp systems on the top and another 8 on the bottom, the scaling of gain length is easily achieved. Enlarging the cross sectional height and width dimensions from the 2.5 cm reported in this invention to 10 cm will still retain uniform pumping since UV lamps will be placed on both sides of the gain medium. In addition, increasing the plasma lamp powers from 3 KW to 6 KW will also provide more uniform volumetric excitation of the transversely flowing iodine gain medium. Using this 20 liter volume, output laser power versus volumetric power correlates by scaling as follows: 1 kW to 50 mW./$cm^3$; 5 kW to 250 mW/$cm^3$; and 10 kW to 0.5 W/$cm^3$. At 1 KW, only 50 mw/$cm^3$ needs to be extracted from the iodine gain medium, a very reasonable value. As an example, consider the following case for a better quantitative understanding. With 85% outcoupling at 1 kilowatt in a 10×10 $cm^2$ cross sectional area, the stimulated emission rate is 395/seconds which relates to $10^{15}$/$cm^3$ excited iodine atoms are required to achieve this scw laser power level. Such densities are easy to achieve and give credibility to the scaling of this cw, photolytic atomic iodine laser technology to 1–10 kilowatts.

A laser system consisting of several separate photolytically excited atomic iodine gain cells can be ganged to make a much longer gain cell (n-times the number of ganged gain regions) which lases with a single resonator. An alternative to this mode is to operate each gain region with separate resonators and have their output phase couple to produce a higher output atomic iodine laser system.

Figure 12:
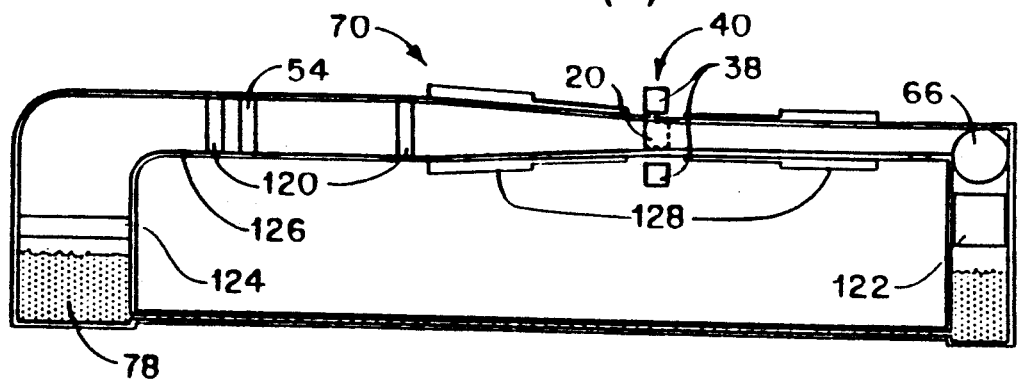
FIGS. 12(a-(b) illustrate a scaled cw, photolytic atomic iodine laser having (a) a transverse flow, cw photolytic iodine laser and (b) a compact iodine laser.
Figure 12:
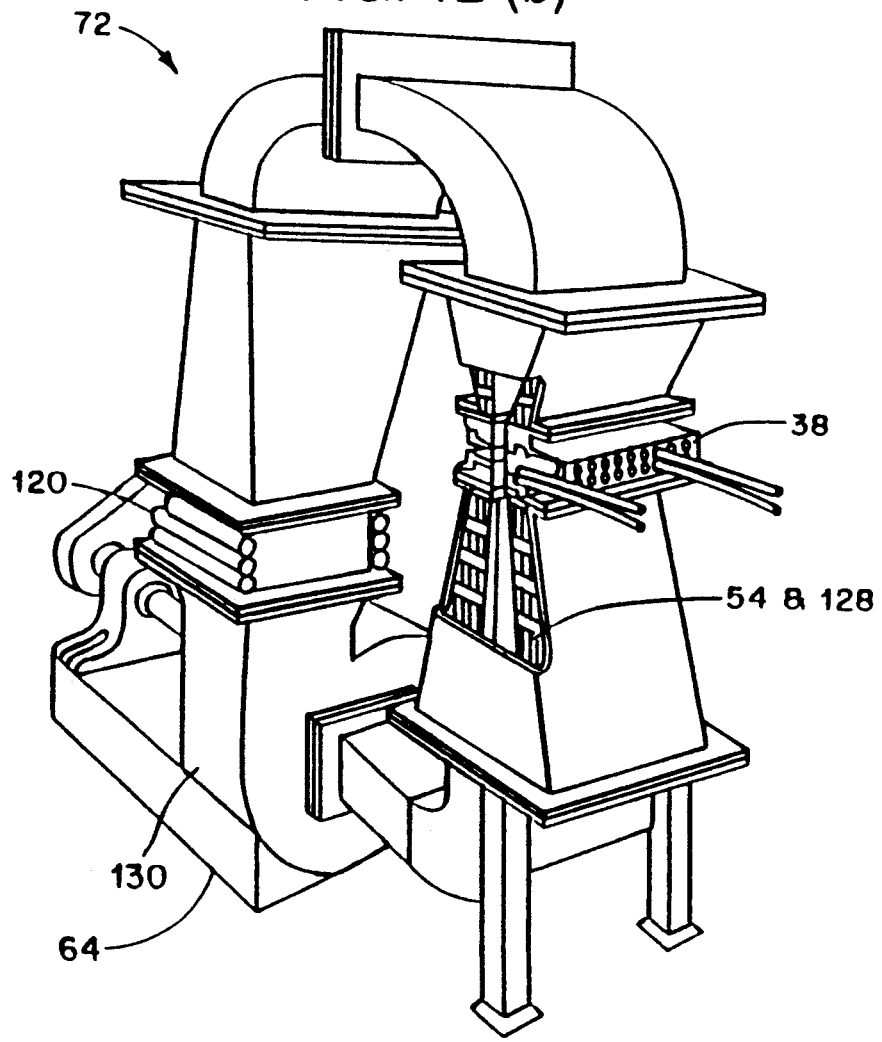

FIG. 12 shows two apparatus 70 and 72 for a 1–10 KW photolytic atomic iodine laser. In FIG. 12(a), a transverse flow iodine laser system 20 with flow velocity horizontal from left to right while in FIG. 12(b) such flow velocity is established vertical from the top to bottom. In FIG. 12(a) the $C_3F_7I$ flows through heat exchangers which also serve as flow straighteners and then through the iodine gain pumping region. After such excitation and subsequent lasing, the gas flows into the cold plates 122 where the $C_3F_7I$ condenses along with the $I_2$ by-product. In the closed cycle laser "fuel" system, the $I_2$ is removed and the process continues. The UV lamps 38 refers to the microwave excited, d.c., low ripple UV plasma lamps. As seen in FIG. 12(a), a liquid $C_3F_7I$ 78 after being vaporized passes through splash plates 124, insulation blocks 126, heat exchanges 120 and then into the gain region 40. Positioned about the gain cell 40 are acoustic attenuators 128. The spent fuel then passes through the insulation blocks 126 into the blower 66 and then to the cold plates for condensation into liquid for return. FIG. 12(b) is similar to FIG. 12(a) except the gas flow is vertical. This includes the evaporative/condensative $I_2$ removal system 64 and a blower 130 with a scrubber.

Figure 13:
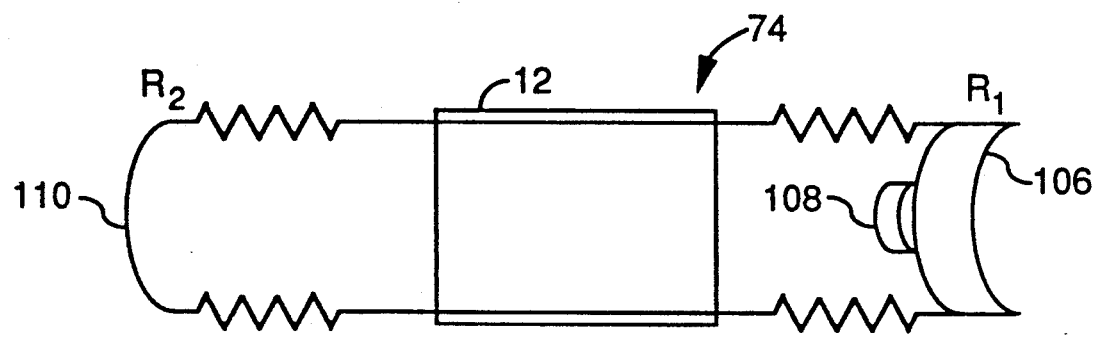
FIGS. 13(a)-(b) illustrate a confocal, unstable resonator for the cw, photolytic atomic iodine laser having (a) an unstable confocal resonator with transmissive coupled feedback mirror and (b) a parasitic control for the unstable confocal resonator.
Figure 13:
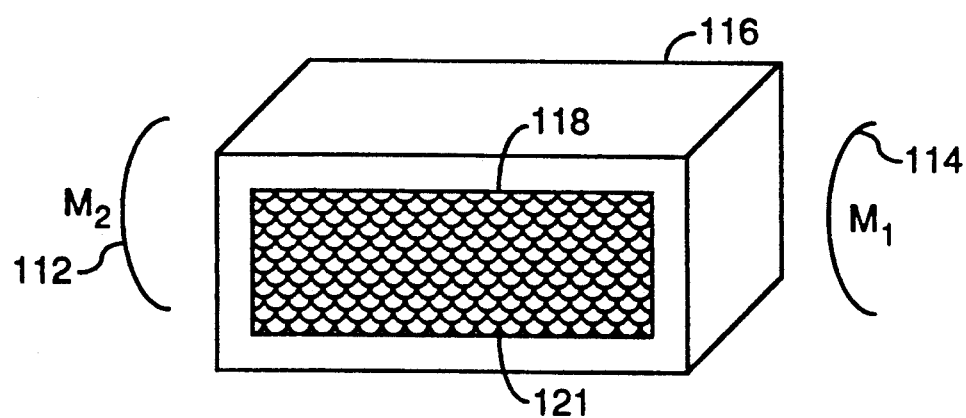

For the two systems, an unstable resonator will be required due to the large gain-length products and the larger cross sectional areas present in these cw, photolytic atomic iodine laser devices. FIG. 13 illustrates a confocal, positive branch unstable resonator. The gain cell 12 is positioned between a mirror R2 110 and a meniscus mirror R 106 with a feedback mirror 108 thereon. No negative branch unstable, confocal resonator would be used since an internal focus was desired such as internal frequency doubling would require. This unstable resonator would have all mirror internally mounted. In addition, all the internal metallic (normally aluminum) walls would be "roughened-up" to typically a 60–100 mesh. On the UV transmitting windows, a "fence" would be required as FIG. 13(b) shows to minimize any undesired, parasitic oscillations. As seen therein, resonator mirrors 112 and 114 are internally mounted about the gain cell area 116 with a 50 mil high fence 118 mounted on the UV window 121.

One of the attract features of a cw, photolytic atomic iodine laser is its potential for good efficiency. Optimized efficiencies as high as 7% may be possible. FIG. 14 gives results to characterize its efficiency. The symbol $\eta$ represents efficiency in percent and the subscript under each symbol denotes its description as abbreviate by the enclosed "( )" information. For the near term performance, nearly 2% efficiency can be expected, FIG. 14(a). Higher efficiencies would be possible if the power conditioning, microwave efficiency, and UV lamps efficiencies would be possible if the power conditioning, microwave efficiency, and UV lamps efficiencies were optimized. An excellent 6–8% is possible as FIG. 14(b) indicates.

Figure 15:
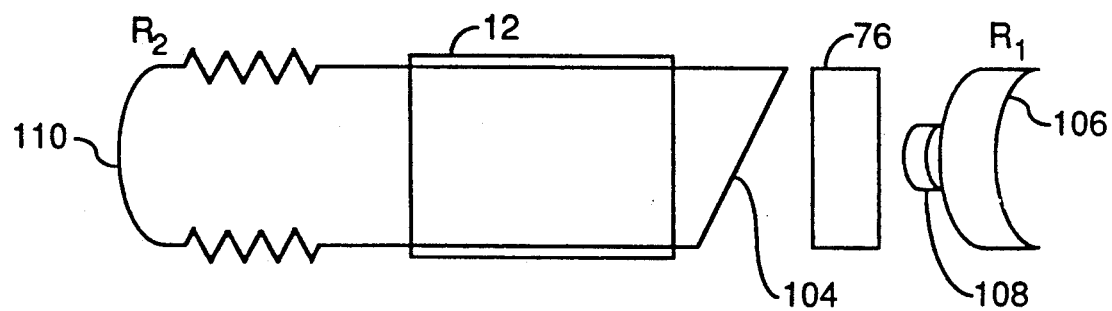
FIG. 15 illustrates an internal electro-optical switch for producing variable pulsewidth, repetitive pulsed iodine laser with the cw, photolytically excited iodine gain medium.

FIG. 15 illustrates the use of an internal electro-optical switch 26 to produce a variable pulsewidth, repetitive output iodine laser output. Operation of such variable pulsed operation with a cw excited iodine gain medium is possible since the gain decay is quite small, less than 20% decrease from a peak value in 1 millisecond. Operating as such, it is critical to place an AR (anti-reflection) optical flat at an angle (>10–15 degrees) so no parasitic oscillation occurs. As seen therein, a menisus mirror 106 with a feedback mirror 108 is coupled to the gain cell 12 with a mirror 110 opposite to the mirror 106.

Additionally, a pulsed d.c. flashlamp can be superimposed on the cw photolytically excited gain medium to acquire higher peak laser powers while still lasing in the cw mode; pulsed microwave operation of the electrodeless UV plasma lamps can be employed with or separately to the cw, microwave UV plasma lamps for excitation of the iodine gain medium; the cw, photolytic gain medium can be extended to other gaseous lasing mediums like IBr and $Br_2$ which lase in the 2–5 micron region.

Clearly, many modifications and variations of the present invention ar possible in light of the above teachings and it is therefore understood, that within the inventive scope of the inventive concept, the invention may be practiced otherwise than specifically claimed.

What is claimed is:

1. A scalable and stable, cw, high power, photolytic atomic iodine laser system, said laser system comprising:

means for providing ultraviolet radiation to a laser gas medium to produce excited atomic iodine for a lasing medium, said means for providing ultraviolet radiation comprising a plurality of RF/microwave sources and a plurality of plasma lamps connected to said RF/microwave sources for outputting ultraviolet energy;

a laser fuel system, said fuel system providing a continuous flow of a laser fuel to form said laser gas medium, said laser fuel system further cleaning undesired material from said laser fuel;

at least one laser gain cell, said laser gain cell having said laser gas medium flowing therethrough, said laser gas medium while therein reacting with said ultraviolet radiation; and at least one laser resonator, said laser resonator connected to said at least one laser gain cell, said laser resonator outputting a laser beam.

2. A laser system as defined in claim 1 wherein said RF/microwave sources provide d.c., low ripple microwave radiation to said plasma lamps.

3. A laser system as defined in claim 2 wherein said ripple is about 1 percent or less.

4. A laser system as defined in claim 2 wherein said RF/microwave sources have magnetrons therein operating in a range from 1 to 4 kilowatts of output power.

5. A laser system as defined in claim 1 wherein said plasma lamps are electrodeless and have means for cooling said plasma lamps either by air or a UV transmissive liquid.

6. A laser system as defined in claim 1 wherein said lamps are filled by a material selected from the group consisting of Hg, inert gas halides and metal halides.

7. A laser system as defined in claim 5 wherein said means for cooling is provided by flowing liquid with minimization of UV absorption to maximize extractable laser energy, said liquid being dimethyl polysiloxane, said cooling being in a temperature range from about 50° C. to about 200° C.

8. A laser system as defined in claim 1 further including elliptical reflectors behind said lamps for collimating the microwave radiation into the laser gain medium.

9. A laser system as defined in claim 1 a space being said lamps and said gain cells are purged with non-oxygen containing gases.

10. A laser system as defined in claim 5 wherein said plasma lamps output UV radiation into a band optimized for alkyl-iodides.

11. A laser system as defined in claim 10 wherein said plasma lamps output UV radiation into the band from about 230 to about 320 nm.

12. A scalable and stable, cw, high power, photolytic atomic iodine laser system, said laser system comprising:
- means for providing ultraviolet radiation to a laser gas medium to produce excited atomic iodine for a lasing medium, said means for providing ultraviolet radiation comprising a plurality of RF/microwave sources and a plurality of plasma lamps connected to said RF/microwave sources for outputting ultraviolet energy;
- a laser fuel system, said fuel system providing a continuous flow of a laser fuel to form said laser gas medium, said laser fuel system further cleaning undesired material from said laser fuel, said laser fuel system being selected from the group consisting of a non-passive closed cycle system, a closed cycle/blow-down system, and a partially open/blow-down system;
- at least one laser gain cell, said laser gain cell having said laser gas medium flowing therethrough, said laser gas medium while therein reacting with said ultraviolet radiation; and
- at least one laser resonator, said laser resonator connected to said at least one laser gain cell, said laser resonator outputting a laser beam.

13. A laser system as defined in claim 12 said laser fuel system comprises:
- an evaporator section, said evaporator section having a liquid fuel therein, said liquid fuel being made gaseous therein;
- a condenser section, said condenser section receiving spent gaseous fuel from said gain cell and converting said gaseous fuel into said liquid fuel; and
- means for removing undesired materials from said spent gaseous fuel and said gaseous fuel.

14. A laser system as defined in claim 13 further including a blower, said flow receiving said gaseous fuel and outputting said gaseous fuel at a given pressure and velocity, said gaseous fuel being output into said laser gain cell;

15. A laser system as defined in claim 13 wherein said undesired material is selected from the group consisting of $I_2$, $O_2$, $H_2O$, and $N_2$.

16. A laser system as defined in claim 15 wherein said $I_2$ is removed by means of copper material.

17. A laser system as defined in claim 14 wherein said blower is able to transport a heavy molecular iodine containing gas at a flow velocity from about 1 to about 40 meters per second in a pressure range of 5 to 100 torr.

18. A scalable and stable, cw, high power, photolytic atomic iodine laser system, said laser system comprising:
- means for providing ultraviolet radiation to a laser gas medium to produce excited atomic iodine for a lasing medium;
- a laser fuel system, said fuel system providing a continuous flow of a laser fuel to form said laser gas medium, said laser fuel system further cleaning undesired material from said laser fuel, said laser fuel system being selected from the group consisting of a non-passive closed cycle system, a closed cycle/blow-down system, and a partially open/blow-down system; said laser fuel system comprising: an evaporator section, said evaporator section having a liquid fuel therein, said liquid fuel being made gaseous therein;
- a condenser section, said condenser section receiving spent gaseous fuel from said gain cell and converting said gaseous fuel into said liquid fuel; and
- means for removing undesired materials from said spent gaseous fuel and said gaseous fuel;
- a blower, said blower receiving said gaseous fuel and outputting said gaseous fuel at a given pressure and velocity, said gaseous fuel being output into a laser gain cell, said blower being a turbo-molecular blower, said blower being able to transport a heavy molecular iodine containing gas at a flow velocity from about 1 to about 40 meters per second in a pressure range of 5 to 100 torr;
- at least one laser gain cell, said laser gain cell having said laser gas medium flowing therethrough, said laser gas medium while therein reacting with said ultraviolet radiation; and
- at least one laser resonator, said laser resonator connected to said at least one laser gain cell, said laser resonator outputting a laser beam.

19. A laser system as defined in claim 18 wherein said turbo-molecular blower includes rotors and stators which are vacuum sealed inside thereof by means of a ferrofluidic vacuum rotating seal to prevent oil contamination of said laser fuel.

20. A laser system as defined in claim 17 wherein said pressure is preferably 10 to 30 Torr.

21. A scalable and stable, cw, high power, photolytic atomic iodine laser system, said laser system comprising:
- means for providing ultraviolet radiation to a laser gas medium to produce excited atomic iodine for a lasing medium, said means for providing ultraviolet radiation comprising a plurality of RF/microwave sources and a plurality of plasma lamps connected to said RF/microwave sources for outputting ultraviolet energy;
- a laser fuel system, said fuel system providing a continuous flow of a laser fuel to form said laser gas medium, said laser fuel system further cleaning undesired material from said laser fuel;
- at least one laser gain cell, said laser gain cell having said laser gas medium flowing therethrough, said laser gas medium while therein reacting with said ultraviolet radiation, said laser gain cell operating in the transverse mode; and
- at least one laser resonator, said laser resonator connected to said at least one laser gain cell, said laser resonator outputting a laser beam.

22. A laser system as defined in claim 21 wherein each gain cell has an opposing UV window.

23. A scalable and stable, cw, high power, photolytic atomic iodine laser system, said laser system comprising:
- means for providing ultraviolet radiation to a laser gas medium to produce excited atomic iodine for a lasing medium;
- a laser fuel system, said fuel system providing a continuous flow of a laser fuel to form said laser gas medium, said laser fuel system further cleaning undesired material from said laser fuel;
- at least one laser gain cell, said laser gain cell having said laser gas medium flowing therethrough, said laser gas medium while therein reacting with said ultraviolet radiation, said at least one laser gain cell operating in either a longitudinal or transverse mode, said gain cell further including flow straighteners therein, said at least one laser gain cell further including means to minimize parasitic oscillations; and at least one laser resonator, said laser resonator connected to said at least one laser gain cell, said laser resonator outputting a laser beam.

24. A laser system as defined in claim 23 wherein said means includes a fence placed upon said UV windows.

25. A scalable and stable, cw, high power, photolytic atomic iodine laser system, said laser system comprising:

means for providing ultraviolet radiation to a laser gas medium to produce excited atomic iodine for a lasing medium, said means for providing ultraviolet radiation comprising a plurality of RF/microwave sources and a plurality of plasma lamps connected to said RF/microwave sources for outputting ultraviolet energy;

a laser fuel system, said fuel system providing a continuous flow of a laser fuel to form said laser gas medium, said laser fuel system further cleaning undesired material from said laser fuel;

at least one laser gain cell, said laser gain cell having said laser gas medium flowing therethrough, said laser gas medium while therein reacting with said ultraviolet radiation; and at least one laser resonator, said laser resonator connected to said at least one laser gain cell, said laser resonator outputting a laser beam, said laser resonator operating in the unstable mode.

26. A laser system as defined in claim 25 wherein said resonator is an unstable confocal resonator.

27. A laser system as defined in claim 26 wherein said resonator operates on a positive or negative branch.

28. A scalable and stable, cw, high power, photolytic atomic iodine laser system, said laser system comprising:

means for providing ultraviolet radiation to a laser gas medium to produce excited atomic iodine for a lasing medium, said ultraviolet radiation being provided by d.c. microwave excited lamps having low ripple, further said lamps being liquid cooled;

a laser fuel system, said fuel system providing a continuous flow of a laser fuel to form said laser gas medium, said laser fuel system further cleaning undesired material from said laser fuel, said continuous flow being provided by a turbo-molecular blower being able to move heavy molecular gases;

at least one laser gain cell, said laser gain cell having said laser gas medium flowing therethrough, said laser gas medium while therein reacting with said ultraviolet radiation; and at least one laser resonator, said laser resonator connected to said at least one laser gain cell, said laser resonator outputting a laser beam.

29. A scalable and stable, cw, high power, photolytic atomic iodine laser system, said laser system comprising:

means for providing ultraviolet radiation to a laser gas medium to produce excited atomic iodine for a lasing medium;

a laser fuel system, said fuel system providing a continuous flow of a laser fuel to form said laser gas medium, said laser fuel system further cleaning undesired material from said laser fuel;

a plurality of laser gain cells, said laser gain cells having said laser gas medium flowing therethrough, said laser gas medium while therein reacting with said ultraviolet radiation; and at least one laser resonator, said laser resonator connected to said at least one laser gain cell, said laser resonator outputting a laser beam.

30. A laser system as defined in claim said laser system comprises:

means for providing ultraviolet radiation to a laser gas medium to produce excited atomic iodine for a lasing medium, said ultraviolet radiation being provided by d.c. microwave excited lamps having low ripple, further said lamps being liquid cooled; and said fuel system providing a continuous flow of a laser fuel to form said laser gas medium, said laser fuel system further cleaning undesired material from said laser fuel, said continuous flow being provided by a turbo-molecular blower being able to move heavy molecular gases.

31. A scalable and stable, cw, high power, photolytic atomic iodine laser system, said laser system comprising:

means for providing ultraviolet radiation to a laser gas medium to produce excited atomic iodine for a lasing medium, said means for providing ultraviolet radiation comprising a plurality of RF/microwave sources and a plurality of plasma lamps connected to said RF/microwave sources for outputting ultraviolet energy;

a laser fuel system, said fuel system providing a continuous flow of a laser fuel, said laser fuel being $C_3F_7I$ lasing on 1.315 microns, to form said laser gas medium, said laser fuel system further cleaning undesired material from said laser fuel;

at least one laser gain cell, said laser gain cell having said laser gas medium flowing therethrough, said laser gas medium while therein reacting with said ultraviolet radiation; and at least one laser resonator, said laser resonator connected to said at least one laser gain cell, said laser resonator outputting a laser beam.

32. A scalable and stable, cw, high power, photolytic atomic iodine laser system, said laser system comprising:

means for providing ultraviolet radiation to a laser gas medium to produce excited atomic iodine for a lasing medium, said means for providing ultraviolet radiation comprising a plurality of RF/microwave sources and a plurality of plasma lamps connected to said RF/microwave sources for outputting ultraviolet energy;

a laser fuel system, said fuel system providing a continuous flow of a laser fuel to form said laser gas medium, said laser fuel system further cleaning undesired material from said laser fuel;

at least one laser gain cell, said laser gain cell having said laser gas medium flowing therethrough, said laser gas medium while therein reacting with said ultraviolet radiation; and at least one laser resonator, said laser resonator connected to said at least one laser gain cell, said laser resonator outputting a laser beam, said resonator having therein electro-optical switches to provide a variable pulse width and a repetitive output.

33. A scalable and stable, cw, high power, photolytic atomic iodine laser system, said laser system comprising:

means for providing ultraviolet radiation to a laser gas medium to produce excited atomic iodine for a lasing medium, said means for providing ultraviolet radiation comprising a plurality of RF/microwave sources and a plurality of plasma lamps connected to said RF/microwave sources for outputting ultraviolet energy, said means further including pulsed flashlamps in addition to cw lamps;

a laser fuel system, said fuel system providing a continuous flow of a laser fuel to form said laser gas medium, said laser fuel system further cleaning undesired material from said laser fuel;

at least one laser gain cell, said laser gain cell having said laser gas medium flowing therethrough, said laser gas medium while therein reacting with said ultraviolet radiation; and at least one laser resonator, said laser resonator connected to said at least one laser gain cell, said laser resonator outputting a laser beam.

* * * * *